United States Patent
Vierich et al.

(10) Patent No.: US 11,230,073 B2
(45) Date of Patent: Jan. 25, 2022

(54) METHOD FOR PRODUCING AN AT LEAST PARTIALLY CONTOURED, FIBRE REINFORCED PLASTIC PROFILE, A CONTOURED, FIBRE REINFORCED PLASTIC PROFILE AND ITS USE

(71) Applicants: thyssenkrupp AG, Essen (DE); THYSSENKRUPP CARBON COMPONENTS GMBH, Wilsdruff Stt Kesselsdorf (DE)

(72) Inventors: Martin Vierich, Dresden (DE); Christian Paul, Meissen (DE); Karsten Weisbrod, Ohorn (DE)

(73) Assignees: THYSSENKRUPP AG, Essen (DE); THYSSENKRUPP CARBON COMPONENTS GMBH, Wilsdruff Stt Kesselsdorf (DE)

( * ) Notice: Subject to any disclaimer, the term of this patent is extended or adjusted under 35 U.S.C. 154(b) by 409 days.

(21) Appl. No.: 16/305,344

(22) PCT Filed: Jun. 7, 2017

(86) PCT No.: PCT/EP2017/063866
§ 371 (c)(1),
(2) Date: Nov. 28, 2018

(87) PCT Pub. No.: WO2017/211904
PCT Pub. Date: Dec. 14, 2017

(65) Prior Publication Data
US 2020/0316879 A1    Oct. 8, 2020

(30) Foreign Application Priority Data
Jun. 7, 2016    (DE) ..................... 10 2016 210 040.8

(51) Int. Cl.
*B29C 59/04*    (2006.01)
*B29K 101/10*    (2006.01)
(Continued)

(52) U.S. Cl.
CPC .......... *B29C 70/504* (2013.01); *B29C 59/043* (2013.01); *B29C 70/081* (2013.01);
(Continued)

(58) Field of Classification Search
CPC ... B29C 59/043; B29C 70/504; B29C 70/506; B29C 70/521; B29C 70/081; E04C 5/03; E04C 5/07; E04C 5/073
See application file for complete search history.

(56) References Cited

U.S. PATENT DOCUMENTS 4,559,188 A * 12/1985 Tassone ................ B29B 15/122
                                                  264/108
4,620,401 A    11/1986 L Esperance
(Continued)

FOREIGN PATENT DOCUMENTS

CN    103608168 A    2/2014
DE    10 2011 015 160 A    9/2012
(Continued)

OTHER PUBLICATIONS

English Translation of International Search Report issued in PCT/EP2017/063866, dated Aug. 28, 2017.

*Primary Examiner* — Christine T Cajilig
(74) *Attorney, Agent, or Firm* — Heslin Rothenberg Farley & Mesiti P.C.

(57) ABSTRACT

A method for producing a partially contoured, fiber-reinforced plastic profile includes providing a plurality of first reinforcing fibers. The first reinforcing fibers are combined to produce a uni-, bi-, or tridirectional fiber bundle. The fiber bundle is impregnated with a first plastic matrix. The
(Continued)

impregnated fiber bundle is supplied to a unit for at least partial shaping or for at least partial shaping and at least partial curing of the first plastic matrix to produce a fiber-reinforced plastic base element. Second reinforcing fibers are provided for at least partial application to the fiber-reinforced plastic base element. The fiber-reinforced plastic base element is provided with the second reinforcing fibers for at least partial fiber-reinforced profiling and/or shaping to produce an at least partially contoured, fiber-reinforced plastic strand and the at least partially contoured, fiber-reinforced plastic strand is cut to produce an at least partially contoured, fiber-reinforced plastic profile.

10 Claims, 4 Drawing Sheets

(51) Int. Cl.
  *B29C 70/50* (2006.01)
  *B29C 70/08* (2006.01)
  *B29K 101/12* (2006.01)
  *E04C 5/03* (2006.01)
  *E04C 5/07* (2006.01)
  *B29K 307/04* (2006.01)

(52) U.S. Cl.
  CPC ............... *E04C 5/03* (2013.01); *E04C 5/07* (2013.01); *B29K 2101/10* (2013.01); *B29K 2101/12* (2013.01); *B29K 2307/04* (2013.01)

(56) References Cited

U.S. PATENT DOCUMENTS

| | | | | |
|---|---|---|---|---|
| 4,876,143 | A * | 10/1989 | Sugita | B29C 70/088 428/298.4 |
| 5,650,109 | A * | 7/1997 | Kaiser | B29C 70/081 264/136 |
| 5,727,357 | A | 3/1998 | Arumugasaamy | |
| 2001/0023568 | A1* | 9/2001 | Edwards | E04C 5/03 52/649.1 |
| 2006/0090416 | A1* | 5/2006 | Braasch | E04B 1/0038 52/649.1 |
| 2010/0224309 | A1* | 9/2010 | Tashiro | B29B 9/06 156/148 |
| 2014/0322511 | A1 | 10/2014 | Beraud | |
| 2015/0167302 | A1* | 6/2015 | Stempniewski | E04B 1/98 442/60 |
| 2015/0204075 | A1* | 7/2015 | Tsukamoto | B29C 53/083 52/309.1 |
| 2016/0052229 | A1 | 2/2016 | Beraud | |
| 2018/0127980 | A1* | 5/2018 | Fuchsmann | C08J 5/0405 |

FOREIGN PATENT DOCUMENTS

| | | | | |
|---|---|---|---|---|
| EP | 2 857 607 A | | 4/2015 | |
| EP | 2857607 A1 * | | 4/2015 | ............... E04C 5/07 |
| WO | 93/08 976 A | | 5/1993 | |
| WO | 96/00 824 A | | 1/1996 | |
| WO | 96/16 792 A | | 6/1996 | |
| WO | 2010/048 688 A | | 5/2010 | |

* cited by examiner

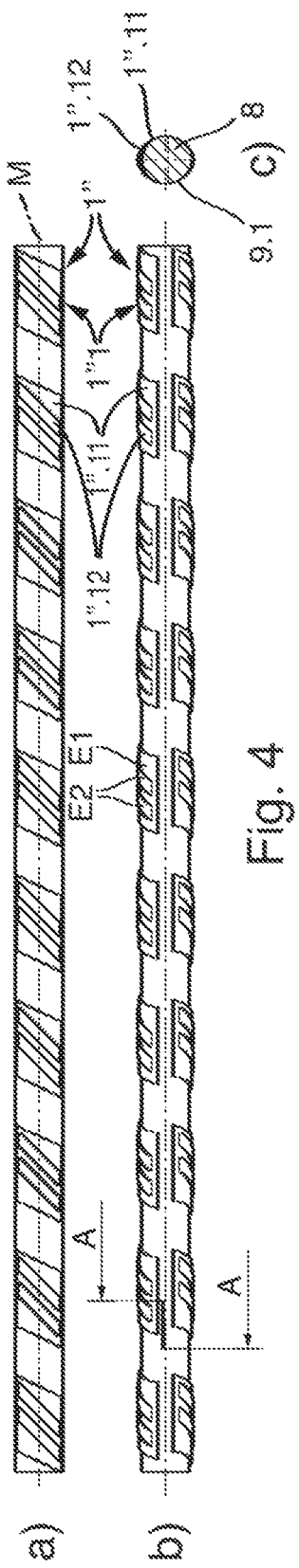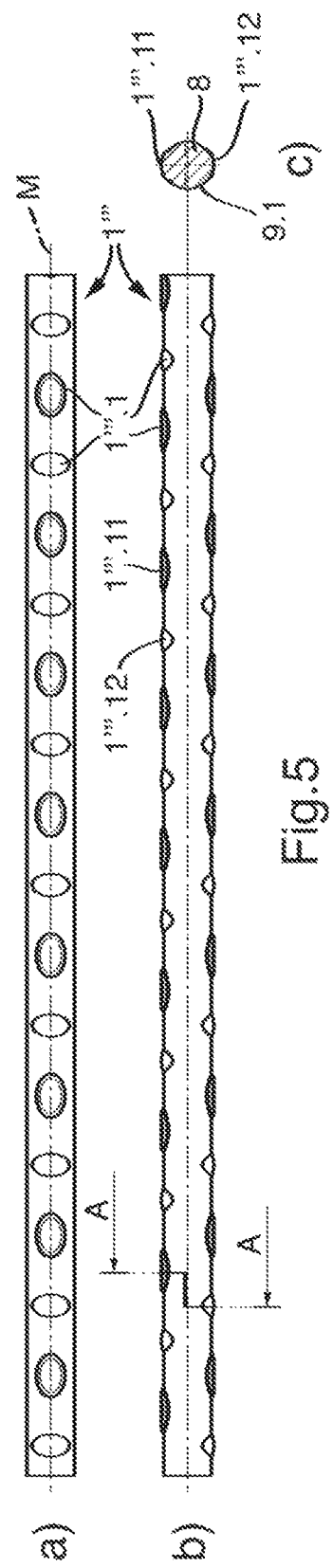

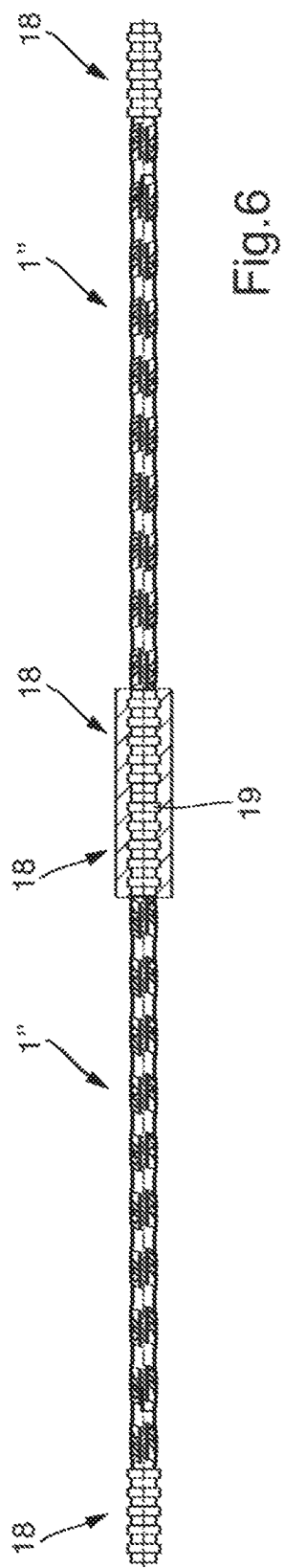

METHOD FOR PRODUCING AN AT LEAST PARTIALLY CONTOURED, FIBRE REINFORCED PLASTIC PROFILE, A CONTOURED, FIBRE REINFORCED PLASTIC PROFILE AND ITS USE

CROSS REFERENCE TO RELATED APPLICATIONS

This application is a U.S. National Stage Entry of International Patent Application Serial Number PCT/EP2017/063866, filed Jun. 7, 2017, which claims priority to German Patent Application No. DE 10 2016 210 040.8, filed Jun. 7, 2016, the entire contents of both of which are incorporated herein by reference.

FIELD

The present disclosure generally relates to a method for producing an at least partially contoured, fiber-reinforced plastic profile.

BACKGROUND

Methods for producing contoured, fiber-reinforced plastic profiles are known in the prior art, in particular for producing reinforcing bars for construction. The plastic profiles comprise a unidirectional-fiber-reinforced plastic base element that can be economically produced, for example by the pultrusion method.

On the one hand, the plastic base element can be tightly wrapped with further fibers in the form of a fiber bundle, a so-called roving. The strand tension of the wrapped roving can be so high that the fibers can become entangled in the unidirectional-fiber-reinforced plastic base element, which can give rise to defects in the fiber bundle of the plastic base element. By means of the wound roving, a profile is produced over the length of the plastic base element which, in the use of the contoured, fiber-reinforced plastic profile in construction, functions for example as anchoring for concrete (cf. U.S. Pat. No. 420401). The configuration of the profiling essentially depends on the diameter of the wound roving and the winding angle.

On the other hand, the plastic base element can be loosely wrapped with further fibers in the form of a roving. Because of the low strand tension of the wrapped roving, binding of the wound roving (profiling) to the plastic base element takes place solely via matrix adhesion, with the result that only a minimal load can be applied, and one cannot rule out premature failure of the profiling as a result thereof. The configuration of the profiling essentially depends on the diameter of the wound roving and the winding angle.

In the above-mentioned methods, the orientation of the wound roving is not optimal for the load direction of the contoured, fiber-reinforced plastic profile. In both methods, the wound roving structures are subject to unfavorable transverse pressure loading. The fibers used here, such as basalt, carbon, or glass fibers, show the lowest load-bearing capacity when loaded transversely to the fiber.

As further prior art documents, WO 1996/000824 A1 and U.S. Pat. No. 5,727,357 are to be mentioned. In the prior art discussed above, limits are placed on profiling design freedom.

Thus a need exists for producing a partially contoured, fiber-reinforced plastic profile and a contoured, fiber-reinforced plastic profile that allows a high degree of design freedom with respect to profiling and fiber orientation suitable for the load path (tension and/or pressure) in the plastic base element and in the profiling and can be individually adapted to the application in question.

BRIEF DESCRIPTION OF THE FIGURES

FIG. 4a is a schematic top view of a third example of a contoured, fiber-reinforced plastic profile and a section through A-A.

FIG. 4b is a schematic side view of a third example of a contoured, fiber-reinforced plastic profile and a section through A-A.

FIG. 4c is a schematic view of the area of profiling in a third example of a contoured, fiber-reinforced plastic profile and a section through A-A.

FIG. 5a is a schematic top view of a fourth example of a contoured, fiber-reinforced plastic profile and a section through A-A.

FIG. 5b is a schematic side view of a fourth example of a contoured, fiber-reinforced plastic profile and a section through A-A.

FIG. 5c is a schematic view of the area of profiling in a fourth example of a contoured, fiber-reinforced plastic profile and a section through A-A.

FIG. 6 is a schematic view of the connection of a plurality of contoured, fiber-reinforced plastic profiles to one another.

DETAILED DESCRIPTION

Figure 1:
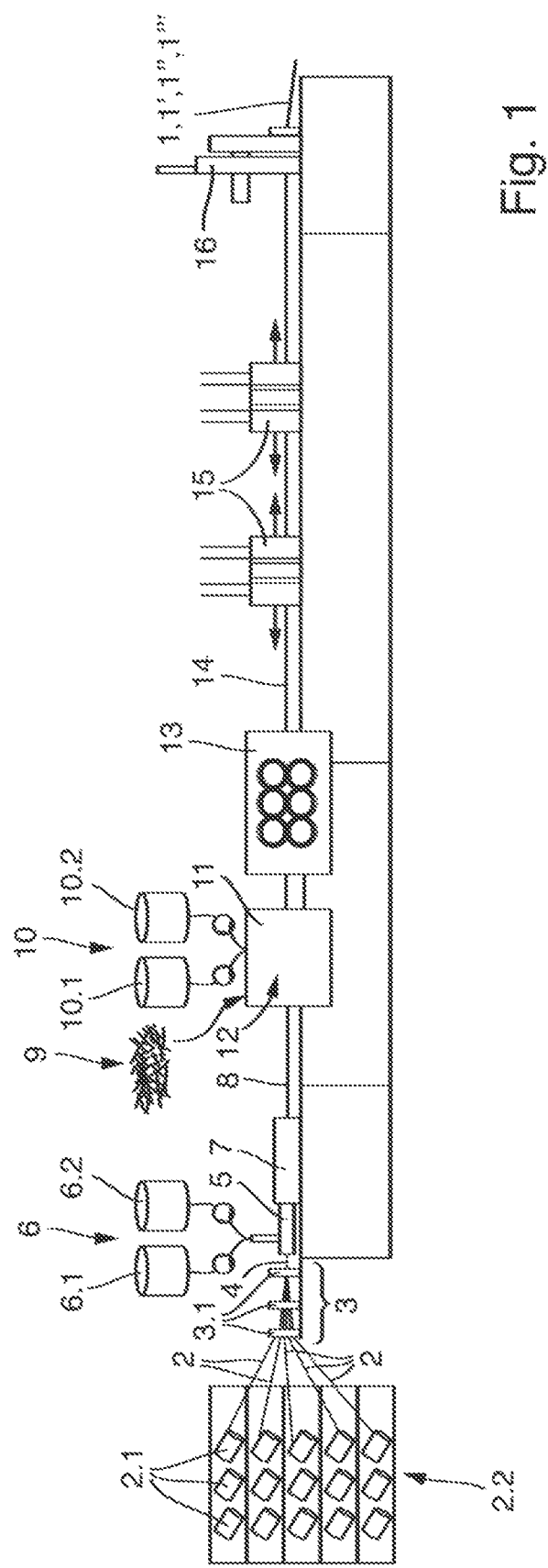
FIG. 1 is a schematic view of a production device for carrying out a method for the continuous production of a contoured, fiber-reinforced plastic profile.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates, in an embodiment, to a method for producing an at least partially contoured, fiber-reinforced plastic profile including the following method steps:

providing a plurality of first reinforcing fibers, preferably long and/or continuous fibers, supplying the first reinforcing fibers to a unit for combining the first reinforcing fibers in order to produce a uni-, bi-, or tridirectional fiber bundle, supplying the fiber bundle to a unit for impregnating the fiber bundle with a first plastic matrix, supplying the impregnated fiber bundle to a unit for at least partial shaping or to a unit for at least partial shaping and at least partial or complete curing of the first plastic matrix in order to produce a fiber-reinforced plastic base element, in particular under heating, providing second reinforcing fibers for at least partial application to the fiber-reinforced plastic base element, supplying the fiber-reinforced plastic base element provided with the second reinforcing fibers to a unit for at least partial fiber-reinforced profiling and/or shaping in order to produce an at least partially contoured, fiber-reinforced plastic strand, under pressure, cutting of the at least partially contoured, fiber-reinforced plastic strand in order to produce an at least partially contoured, fiber-reinforced plastic profile.

The invention further relates to a contoured, fiber-reinforced plastic profile comprising a uni-, bi-, or tridirectional-fiber-reinforced plastic base element with an attached fiber-reinforced profiling and corresponding use thereof.

First, a plurality of first reinforcing fibers, in particular continuous fibers, which in particular are wound onto a plurality of rollers, are provided. The first reinforcing fibers are unwound and supplied to a unit for combining the first reinforcing fibers in order to produce a uni-, bi-, or tridirectional fiber bundle. The first reinforcing fibers combined into a fiber bundle are supplied to a unit for impregnating the fiber bundle with a first plastic matrix. The impregnated fiber bundle is then supplied to a unit for at least partial shaping or to a unit for at least partial shaping and at least partial, in particular complete curing of the first plastic matrix in order to produce a fiber-reinforced plastic base element. After this, second reinforcing fibers are provided for at least partial application to the fiber-reinforced plastic base element. The fiber-reinforced plastic base element provided with the second reinforcing fibers is supplied to a unit for at least partial fiber-reinforced profiling and/or shaping in order to produce an at least partially contoured, fiber-reinforced plastic strand. Finally, the at least partially contoured, fiber-reinforced plastic strand is cut off and an at least partially contoured, fiber-reinforced plastic profile is provided. The inventors have found that in the use of the second reinforcing fibers, which are shorter in length than the first reinforcing fibers, in particular in the form of short and/or long fibers, there are virtually no limits on the design freedom of profiling, and the fiber orientation can be optimally configured with respect to the load direction of the at least partially contoured, fiber-reinforced plastic profiles in a matrix to be reinforced, preferably concrete. The profiling can be individually adjusted and produced for each application.

Continuous fibers are understood to be fiber threads having a length of over 50 mm. Continuous fibers are used in fiber-reinforced plastics in the form of a roving, a laid fabric or a woven fabric. Structural components comprising continuous fibers show the highest values for stiffness and strength. Long fibers are understood to be fibers, in particular cut fibers, with a length of 1 to 5 mm. Short fibers are understood to be fibers, in particular cut fibers, with a length of 0.1 to 1 mm.

According to the invention, the at least partial profiling and/or shaping is carried out in order to produce an at least partially contoured, fiber-reinforced plastic strand in a profiling/shaping unit. As the profiling and/or shaping is carried out in the substantially moved plastic base element, various devices can be used as profiling/shaping units. For example, a co-moving press unit, which can only profile respective sections of the plastic base element provided with short and/or long fibers, can be used. The mobile arrangement thus allows discontinuous production of profiling on the continuously moved plastic base element. As a further example, an actively or passively driven roller unit, for example with two opposing rollers that form a gap through which the fiber-reinforced plastic base element provided with short and/or long fibers is guided, can be used. In the rollers, profiling with a correspondingly introduced negative mold is provided. The profiling can also be produced in stages, for example using rollers arranged in series. A shaping chain unit that at least partially encloses the plastic base element can also produce profiling with a correspondingly introduced negative mold. For example, if the chain unit is actively driven, one can dispense with additional draw-off/drive units, so-called pullers, in the pultrusion method.

According to a first embodiment of the method according to the invention, the short and/or long fibers are applied wet as a mixture of short and/or long fibers and a second plastic matrix by scattering and/or spraying. The application can be carried out locally, in particular to the areas in which partial profiling takes place on the fiber-reinforced plastic base element, or the wet short and/or long fibers are applied to the entire surface of the fiber-reinforced plastic base element. The wet short and/or long fibers serve as material for producing the profiling, so that the layer thickness applied depends locally or completely on the final geometry to be produced. Alternatively, the short and/or long fibers can first be applied dry locally or completely to the fiber-reinforced plastic base element by scattering and/or spraying, wherein the short and/or long fibers applied dry are then impregnated with a second plastic matrix in order to provide material for producing the profiling.

According to an alternative embodiment of the method according to the invention, the fiber-reinforced plastic base element is fed through an impregnation unit that is filled with a mixture of short and/or long fibers and a liquid second plastic matrix in order to apply short and/or long fibers impregnated with a second plastic matrix to the fiber-reinforced plastic base element provided for producing the profiling. It is further possible to feed the fiber-reinforced plastic base element, including the applied mixture of short and/or long fibers and the second plastic matrix, through a stripping unit in order to set an optimum respectively specified amount of the mixture of short and/or long fibers and plastic matrix.

According to a further embodiment of the method according to the invention, after application of the short fibers, the fiber-reinforced plastic base element is fed to an electrostatic charging unit for specified orientation of the short and/or long fibers. This has the advantage of allowing the orientation of the short and/or long fibers to be set as needed and in a manner appropriate for the load path (tension and/or pressure).

According to a further embodiment of the method according to the invention, curing of the short and/or long fibers impregnated with a second plastic matrix is carried out during or after the at least partial profiling and/or shaping in order to produce an at least partially contoured, fiber-reinforced plastic strand. For example, the profiling/shaping unit can be heated, so that during production of the profiling, the plastic base element and the profiling (profiling layer), or the profiling (profiling layer) alone, are cured. Alternatively, curing of the plastic base element and the profiling (profiling layer), or the profiling (profiling layer) alone, can take place after production of the profiling, for example by means of a heating/curing unit arranged downstream, for example in the form of a continuous furnace or by means of a heated draw-off/drive unit.

According to a further embodiment of the method according to the invention, at least partial surface structuring can be carried out on the at least partially contoured, fiber-reinforced plastic strand or the at least partially contoured, fiber-reinforced plastic profile, in particular during or after the at least partial profiling and/or shaping, in order to produce an at least partially contoured, fiber-reinforced plastic strand. For this purpose, one can carry out further wrapping with further fibers, additional sanding of the surface, roughening of the cured profile surfaces, or structuring by means of the shaping profiling units in order in this manner to advantageously increase the surface area of the contoured fiber-reinforced plastic profile. Finally, at least partially material-removing surface processing is conceivable, by means of which one can for example produce undercuts on the surface of the contoured, fiber-reinforced plastic profile.

According to a further embodiment of the method according to the invention, a core material can be provided that is supplied together with the first reinforcing fibers to the unit for combining the first reinforcing fibers in order to produce a fiber bundle, wherein the core material is essentially completely enclosed by the first reinforcing fibers in the longitudinal direction. The use of core materials is advantageous because this makes it possible to produce plastic profiles with thicker dimensions without having to completely fill the cross-section of the plastic base element with (cost-intensive) fiber and plastic matrix material. As a core material, one can use rubber, foam, metal or other fillers that are more favorable than the fiber material. It is further possible to remove the core material before the appropriate installation in order in this manner to produce a hollow profile. For this purpose, in addition to the above-mentioned core materials, metallic materials can also be used.

According to a further embodiment of the method according to the invention, the contoured, fiber-reinforced plastic strand can be curved during or after curing. Alternatively, the contoured, fiber-reinforced plastic profile can also be curved subsequently.

According to a second aspect of the invention, the object with respect to the contoured, fiber-reinforced plastic profile according to the invention is achieved by means of the features of claim 9.

The contoured, fiber-reinforced plastic profile comprises a uni-, bi-, or tridirectional-fiber-reinforced plastic base element (reinforcing fibers of the plastic base element). In the case of unidirectional orientation, for example, the fibers are present in stretched form suitable for fibers and the profile can accordingly bear strong tensile forces. Attached to the plastic base element is a fiber-reinforced profiling, which according to the invention contains short and/or long fibers (reinforcing fibers of the profiling). Because of this, there are virtually no limits on freedom of design, for example with respect to the shape, height, angle, etc. of the profiling, compared to the prior art.

According to the invention, the profiling is designed as a rib structure that is not configured around the circumference of the base element, a hemispherical structure, or a lens structure.

For example, the profiling can also be partially configured on different planes. The respective structures of the profiling can also show different orientations, for example at different angles to one another. The profiling can also be configured with constant or variable length. This allows individual profiling.

According to a first embodiment of the plastic profile according to the invention, the fiber-reinforced plastic base element has a round, square, rectangular, or lens-shaped cross-section. The cross-section can be configured with a constant or variable length as needed.

According to a further embodiment of the plastic profile according to the invention, the contoured, fiber-reinforced plastic profile can be configured as a solid or hollow profile and/or as a hybrid profile composed of at least two different materials. The embodiment is not limited to a linear profile, but can also be a two- or three-dimensional embodiment, for example a curved profile.

According to a further embodiment of the plastic profile according to the invention, the reinforcing fibers of the plastic base element are composed of glass fibers, carbon fibers, ceramic fibers, basalt fibers, aramid fibers, flax fibers, hemp fibers, plastic fibers or mixtures thereof. Preferably, carbon fibers, glass fibers, or basalt fibers are used.

According to a further embodiment of the plastic profile according to the invention, the short fibers are composed of glass fibers, carbon fibers, basalt fibers, aramid fibers, flax fibers, hemp fibers, recycled fibers, in particular from the previous base material, metal fibers, plastic fibers or mixtures thereof. Preferably, carbon fibers are used.

According to a further embodiment of the plastic profile according to the invention, the first and/or second plastic matrix is composed of thermoplastic or duroplast.

A third aspect of the invention relates to the use of a contoured fiber-reinforced plastic profile according to the invention as a reinforcing bar, for example for a concrete matrix.

FIG. 1 shows an example of a production device for carrying out a method according to the invention for the continuous production of a contoured, fiber-reinforced plastic profile (1, 1',1", 1''') in a schematic view. First, a plurality of first reinforcing fibers (2), preferably long or continuous fibers, which in particular are wound onto a plurality of rollers (2.1), are provided, which for example are arranged in a multi-level fiber rack or unwinding units (2.2) for the purpose of unwinding. As first reinforcing fibers (2), one can use glass fibers, carbon fibers, ceramic fibers, basalt fibers, aramid fibers, flax fibers, hemp fibers, plastic fibers or mixtures thereof. The first reinforcing fibers (2) can also be processed in the form of textile strips. The first reinforcing fibers (2) are unwound and continuously supplied to a unit (3) for combining the reinforcing fibers (2) in order to produce a fiber bundle (4). By means of one or a plurality of fiber guides (3.1), the reinforcing fibers (2) are combined into a fiber bundle (4). The reinforcing fibers (2) combined into a fiber bundle (4) are continuously supplied to a unit (5) for impregnating the fiber bundle (4) with a first plastic matrix, which is connected to a unit (6) for providing the first plastic matrix. Depending on the matrix material to be produced, whether a duroplast or a thermoplastic, a mixture of two matrix systems (6.1, 6.2) can also be provided in the unit (6). The fiber bundle (4) is completely impregnated in the unit (5). The impregnated fiber bundle is then continuously supplied to a unit (7) for at least partial shaping or for at least partial shaping and at least partial, preferably complete curing of the first plastic matrix in order to produce a fiber-reinforced plastic base element (8). The unit (7) is preferably a heated shaping unit, so that in addition to setting the geometry of the fiber-reinforced plastic base element to be produced (8), in particular its cross-section, which can be configured to be round, square, rectangular, star-shaped, or lens-shaped and as needed can have a constant or variable length, partial, preferably complete curing of the first plastic matrix also takes place by heating, without requiring the provision of further heating/curing units, such as for example continuous furnaces arranged downstream.

After this, second reinforcing fibers (9) in the form of short and/or long fibers are provided for at least partial application to the fiber-reinforced plastic base element (8). As second reinforcing fibers (9), one can use glass fibers, carbon fibers, basalt fibers, aramid fibers, flax fibers, hemp fibers, ceramic fibers, plastic fibers, metal fibers or mixtures thereof. For example, the second reinforcing fibers (9) are at first locally or completely applied in dry form to the fiber-reinforced plastic base element by scattering and/or spraying in a unit (11). The unit (11) is connected to a unit (10) for providing a second plastic matrix that is used for impregnating the second reinforcing fibers (9), which have been applied dry to the fiber-reinforced plastic base element (8). The impregnated reinforcing fibers serve as a material for the profiling to be produced. Depending on the matrix material to be produced, whether a duroplast or a thermoplastic, a mixture of two matrix systems (10.1, 10.2) can also be provided in the unit (10). Alternatively, the second reinforcing fibers (9) can be applied wet as a mixture of reinforcing fibers and a second plastic matrix by scattering and/or spraying in a unit (11). The application can be carried out locally, in particular to the areas in which partial profiling takes place on the fiber-reinforced plastic base element (8), or the wet reinforcing fibers are applied to the entire surface of the fiber-reinforced plastic base element (8). The wet reinforcing fibers provide the material for producing the profiling, so that the layer thickness applied depends locally or completely on the final geometry to be produced. The unit (11) can for example comprise an electrostatic charging unit (12) for orienting the reinforcing fibers (9) and/or a stripping unit (12) for setting the optimum amount of the mixture of reinforcing fibers and the plastic matrix.

The fiber-reinforced plastic base element (8) provided with the second reinforcing fibers (9) is continuously supplied to a unit (13) for at least partial fiber-reinforced profiling and/or shaping in order to produce an at least partially contoured, fiber-reinforced plastic strand (14). As the profiling and/or shaping is carried out on the substantially moved plastic base element (8), different devices can be used as profiling/shaping units (13). For example, a co-moving press unit, which can only profile respective sections of the plastic base element (8) provided with the reinforcing fibers impregnated with the second plastic matrix (9), can be used. The mobile arrangement thus allows discontinuous production of a profiling (1.1, 1'.1, 1".1, 1"'.1) on the continuously moved plastic base element (8). As a further example, an actively or passively driven roller unit, for example with two opposing rollers that form a gap through which the fiber-reinforced plastic base element provided with reinforcing fibers (8) is fed, can be used. In the rollers, profiling with a correspondingly introduced negative mold is provided. The profiling (1.1, 1'.1, 1".1, 1"'.1) can also be produced in stages, for example using rollers (13) arranged in series. A shaping chain unit that at least partially encloses the plastic base element can also produce a profiling with a correspondingly introduced negative mold. For example, if the chain unit is actively driven, one can dispense with additional draw-off/drive units (15), so-called pullers, in the pultrusion method. The unit (13) for at least partial fiber-reinforced profiling and/or shaping in order to produce an at least partially contoured, fiber-reinforced plastic strand (14) is preferably heated in order to carry out partial, preferably complete curing of the plastic base element and the profiling (profiling layer), or the profiling (profiling layer) alone, without requiring that further heating/curing units, such as for example continuous furnaces arranged downstream, be provided. At least one draw-off/drive unit (15) is used as a feed unit, which is movable in or opposite to the draw-off direction of the plastic strand (14), symbolized by the arrow shown, which represents an alternating movement.

Finally, the at least partially contoured, fiber-reinforced plastic strand (14) is cut off in a cutting unit (16), and an at least partially contoured, fiber-reinforced plastic profile (1, 1',1", 1"') is provided.

Because of the use of short and/or long fibers (9) to reinforce the profiling geometry instead of profiles around which continuous fibers are wound, there are virtually no limits on the profiling (1.1, 1'.1, 1".1, 1"'.1), as shown by way of example in FIGS. 2 through 5. Furthermore, in the use of short and/or long fibers (9) to reinforce the profiling geometry instead of profiles around which continuous fibers are wound, the reinforcing fibers (9) can be arranged in a manner appropriate for the load path. The contoured, fiber-reinforced plastic profiles (1, 1',1", 1"') are preferably used in construction as reinforcing bars, in particular in a concrete matrix.

Figure 2:
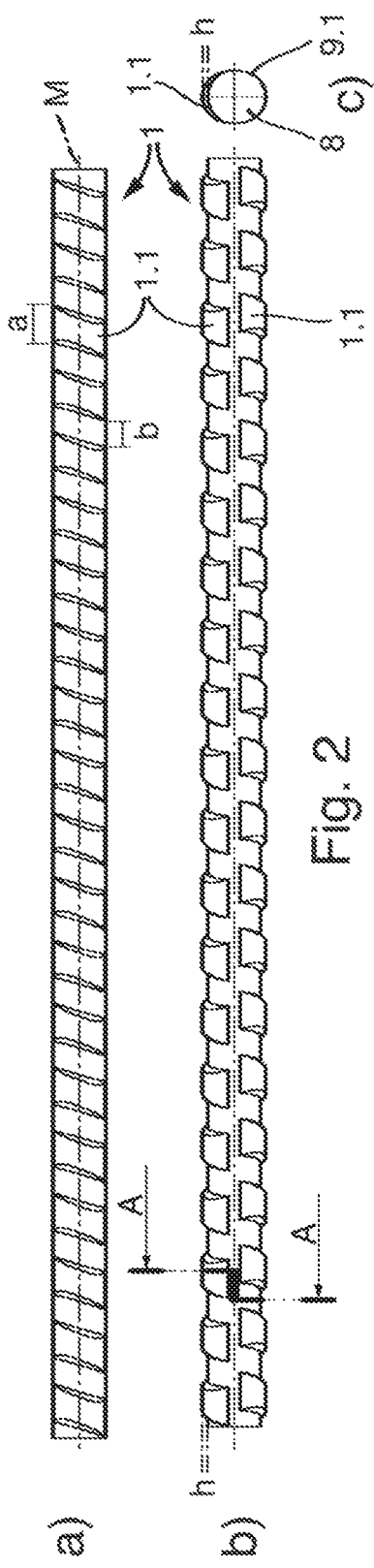
FIG. 2a is a schematic top view of a contoured, fiber-reinforced plastic profile and a section through A-A.
FIG. 2b is a schematic side view of a contoured, fiber-reinforced plastic profile and a section through A-A.
FIG. 2c is a schematic view of the area of profiling of a contoured, fiber-reinforced plastic profile and a section through A-A.

FIG. 2) shows a first example of a contoured, fiber-reinforced plastic profile according to the invention (1) shown in a schematic top view (FIG. 2a)) and side view (FIG. 2b)). For the diagram of the side view, the plastic profile (1) is rotated around the central axis (M) by 90° as seen from above. The contoured, fiber-reinforced plastic profile (1) is composed of a unidirectional-fiber-reinforced plastic base element (8) to which short-fiber-reinforced profiling in the form of a rib structure (1.1) is at least partially attached. Not only is the area of the profiling (1.1) provided with a short- and/or long-fiber-reinforced matrix (9.1), but during application of the short and/or long fibers (9) and the second plastic matrix, the plastic base element (8) is completely covered, so that the short- and/or long-fiber-reinforced matrix (9.1) completely encloses the plastic base element (8), as shown in FIG. 2c). The rib structure (1.1) is not configured circumferentially around the plastic base element (8), but is limited in each case to a maximum of 170° relative to the circumference, wherein the rib structure (1.1) is continuously formed from the base material (9.1) up to a pre-defined height (h). The rib structure (1.1) can preferably be configured at an angle to the central axis (M) with a specified width (b) and with a repeating arrangement at a distance (a). The height (h), width (b), and/or distance (a) of the rib structure (1.1) can be individually set as needed by using a short and/or long fiber (9) for reinforcing the profiling (1.1), and in particular can be arranged in a manner appropriate for the load path.

Figure 3:
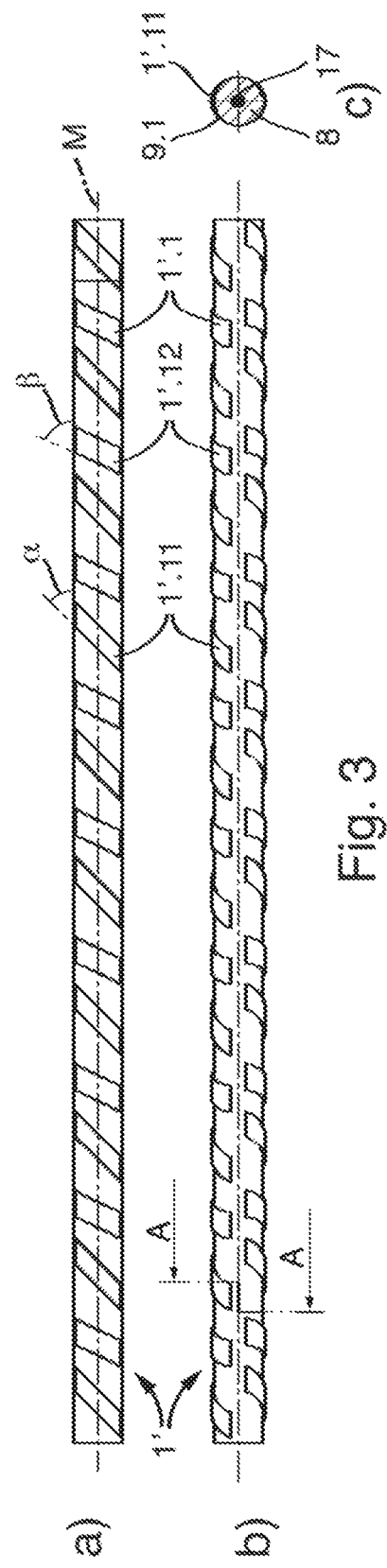
FIG. 3a is a schematic top view of a second example of a contoured, fiber-reinforced plastic profile and a section through A-A.
FIG. 3b is a schematic side view of a second example of a contoured, fiber-reinforced plastic profile and a section through A-A.
FIG. 3c is a schematic view of the area of profiling in a second example of a contoured, fiber-reinforced plastic profile and a section through A-A.

FIG. 3) shows a second example of a contoured, fiber-reinforced plastic profile according to the invention (1') in a schematic top view (FIG. 3a)) and side view (FIG. 3b)). In contrast to FIG. 2), the profiling has a rib structure (1'.11, 1'.12) at least partially reinforced with short and/or long fibers (1'.1) having a repeating pattern which, however, is oriented (1'.11, α) and (1'.12, β) at different angles to the central axis (M). For example, the angles are α=45° and β=65°. During application of the short and/or long fiber and the second plastic matrix, the plastic base element is covered only locally with short and/or long fibers in the area of the profiling to be produced (1'.1), so that the short- and/or long-fiber-reinforced matrix (9.1) is provided only in the area of the profiling (1'.1), as shown in FIG. 3c). Furthermore, a core material (17) can be provided inside the unidirectional-fiber-reinforced plastic base element, in particular in order to allow the diameter (d) of the contoured, fiber-reinforced plastic profile (1') to be increased with simultaneously reduced fiber and matrix material usage.

FIG. 4) shows a third example of a contoured, fiber-reinforced plastic profile according to the invention (1") in a schematic top view (FIG. 4a)) and side view (FIG. 4b)). The at least partially short- and/or long-fiber-reinforced profiling (1".1) is composed of a first plateau-like structure (1".11) that defines a first partial plane ($E_1$) and a one-piece rib-shaped structure (1".12) arranged thereon with two ribs arranged parallel to each other and at an angle to the central axis (M) that define a second partial plane ($E_2$). Not only is the area of the profiling (1".1) provided with a short- and/or long-fiber-reinforced matrix (9.1), but in the process of applying the short and/or long fiber (9) and the second plastic matrix, the plastic base element (8) is completely covered so that the short- and/or long-fiber-reinforced matrix (9.1) fully encloses the plastic base element (8), as shown in FIG. 4c).

FIG. 5) shows a fourth example of a contoured, fiber-reinforced plastic profile according to the invention (1''') in a schematic top view (FIG. 5a)) and side view (FIG. 5b)). In contrast to FIG. 2), the profiling is at least partially reinforced with short and/or long fibers (1'''.1), with an arrangement that varies in the longitudinal direction of a hemispherical structure (1'''.11) and a lens structure (1'''.12). Not only is the area of the profiling (1'''.1) provided with a short- and/or long-fiber-reinforced matrix (9.1), but the short- and/or long-fiber-reinforced matrix (9.1) completely encloses the plastic base element (8), as shown in FIG. 5c).

FIG. 6) shows an example of connection of two plastic profiles (1") using the example of the embodiment of FIG. 4). In the process of producing the plastic profiles, one can produce not only a profiling that is appropriate for the load, but also connection areas (18) that are molded onto the plastic profile strand during continuous production in a continuously recurring manner depending on the length of the plastic profile to be produced, wherein the plastic profile strand is cut off in particular in the middle of the connection areas produced in order to provide a plastic profile that has connection areas (18) at both ends. The geometry of the connection areas (18) can be individually adjusted, and they are preferably configured such that at least two plastic profiles can be connected to each other at their ends via a connecting element (19), preferably in a positive locking and/or non-positive locking manner, in particular via their respective connection areas (18). The connection areas (18) in FIG. 6) show axial grooves, wherein other forms are also conceivable. The production of connection areas (18) is not limited to the example (1") according to FIG. 4), but is applicable to all plastic profiles according to the invention (1, 1',1", 1'''). The plastic profile (1, 1',1", 1''') can have a connection area (18) at one end, and preferably at both of its ends.

The invention is not limited to the description or the examples, with combinations of the examples also being possible.

Rather, the contoured, fiber-reinforced plastic profile can be configured as a solid or hollow profile and/or as a hybrid profile composed of at least two different materials. An (identical) matrix can also be used as the first and second plastic matrix.

LIST OF REFERENCE NOS 1, 1',1", 1''' Contoured, fiber-reinforced plastic profile
2 First reinforcing fiber
2.1 Rollers
2.2 Fiber rack, unwinding unit
3 Unit for combining the first reinforcing fibers
3.1 Fiber guide
4 Fiber bundle
5 Unit for impregnating the fiber bundle
6 Unit for providing the first plastic matrix
6.1, 6.2 Matrix system
7 Heated shaping unit
8 Fiber-reinforced plastic base element
9 Second reinforcing fiber, short and/or long fiber
9.1 Short- and/or long-fiber-reinforced matrix
10 Unit for providing the second plastic matrix
10.1, 10.2 Matrix system
11 Unit for applying the second reinforcing fibers/second plastic matrix
12 Electrostatic charging unit/stripping unit
13 Profiling/shaping unit
14 Contoured, fiber-reinforced plastic strand
15 Draw-off/drive unit
16 Cutting unit
17 Core material
18 Connection area
19 Connecting element
a Distance between rib structures
A Central axis
b Width of rib structure
d Diameter
$E_1$, $E_2$ Planes
h Height of rib structure
α, β Angle

What is claimed is:
1. A method for producing an at least partially contoured, fiber-reinforced plastic profile comprising:
providing a plurality of first reinforcing fibers,
combining the first reinforcing fibers to produce a uni-, bi-, or tridirectional fiber bundle,
impregnating the fiber bundle with a first plastic matrix,
performing at least partial shaping or at least partial shaping and at least partial curing of the first plastic matrix to produce a fiber-reinforced plastic base element,
providing a plurality of second reinforcing fibers for at least partial application to the fiber-reinforced plastic base element, wherein the second reinforcing fibers are shorter in length than the first reinforcing fibers,
passing the fiber-reinforced plastic base element through an impregnation unit filled with a mixture of the second reinforcing fibers and a liquid second plastic matrix to apply the mixture of second reinforcing fibers impregnated with the liquid second plastic matrix to the fiber-reinforced plastic base element at least in regions for profiling, passing the fiber-reinforced plastic base element with the mixture of second reinforcing fibers and the liquid second plastic matrix through a stripping unit, supplying the fiber-reinforced plastic base element provided with the second reinforcing fibers to a unit for at least partial fiber-reinforced profiling and/or shaping where the fiber-reinforced plastic base element is at least partially profiled and/or shaped to produce an at least partially contoured, fiber-reinforced plastic strand, and cutting the at least partially contoured, fiber-reinforced plastic strand to produce an at least partially contoured, fiber-reinforced plastic profile.

2. The method of claim 1, wherein the second reinforcing fibers are applied wet by scattering and/or spraying.

3. The method claim 1, wherein after application of the second reinforcing fibers, the fiber-reinforced plastic base element is supplied to an electrostatic charging unit for specified orientation of the second reinforcing fibers.

4. The method of claim 1, wherein curing of the second reinforcing fibers impregnated with the second plastic matrix is carried out during or after the at least partial profiling and/or shaping in order to produce the at least partially contoured, fiber-reinforced plastic strand.

5. The method of claim 1, wherein at least partial surface structuring is carried out on the at least partially contoured, fiber-reinforced plastic strand or the at least partially contoured, fiber-reinforced plastic profile, during or after the at least partial profiling and/or shaping, to produce the at least partially contoured, fiber-reinforced plastic strand.

6. The method of claim 1, wherein a core material is provided that is supplied together with the first reinforcing fibers to the unit for combining the first reinforcing fibers to produce the fiber bundle, wherein the core material is essentially completely enclosed by the reinforcing fibers in the longitudinal direction or is subsequently removed.

7. The method of claim 1, wherein the contoured, fiber-reinforced plastic strand is curved during or after curing or the contoured, fiber-reinforced plastic profile is subsequently curved.

8. A method for producing an at least partially contoured, fiber-reinforced plastic profile comprising:

providing a plurality of first reinforcing fibers, combining the first reinforcing fibers to produce a uni-, bi-, or tridirectional fiber bundle, impregnating the fiber bundle with a first plastic matrix, performing at least partial shaping or at least partial shaping and at least partial curing of the first plastic matrix to produce a fiber-reinforced plastic base element, providing a plurality of second reinforcing fibers for at least partial application to the fiber-reinforced plastic base element, supplying the fiber-reinforced plastic base element provided with the second reinforcing fibers to a unit for at least partial fiber-reinforced profiling and/or shaping to produce an at least partially contoured, fiber-reinforced plastic strand, and cutting the at least partially contoured, fiber-reinforced plastic strand to produce an at least partially contoured, fiber-reinforced plastic profile, wherein the second reinforcing fibers are shorter in length than the first reinforcing fibers and are provided in the form of short and/or long fibers, wherein the at least partial profiling and/or shaping is carried out in a profiling/shaping unit, wherein the short and/or long fibers are applied dry as a mixture of short and/or long fibers and then impregnated with a second plastic matrix.

9. The method of claim 1, wherein the first reinforcing fibers are long and continuous fibers.

10. The method of claim 1, wherein the at least partial curing occurs under heating.

* * * * *